Oct. 11, 1927.

W. T. BARKER, JR 1,645,221

METHOD AND APPARATUS FOR FEEDING MOLTEN GLASS

Filed Nov. 20, 1926      2 Sheets-Sheet 1

Inventor
Wm T. Barker Jr.
by Robson & Brown
Attorney.

Oct. 11, 1927.  
W. T. BARKER, JR  
1,645,221  
METHOD AND APPARATUS FOR FEEDING MOLTEN GLASS  
Filed Nov. 20, 1926   2 Sheets-Sheet 2
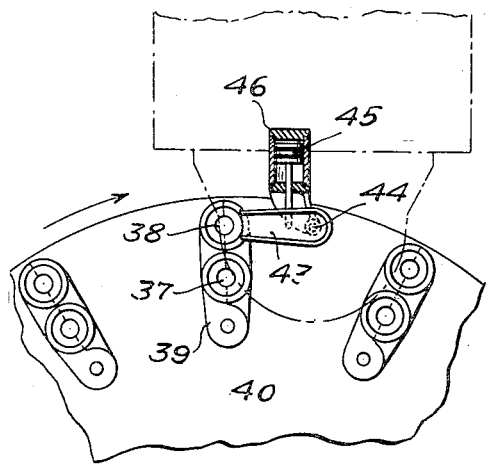
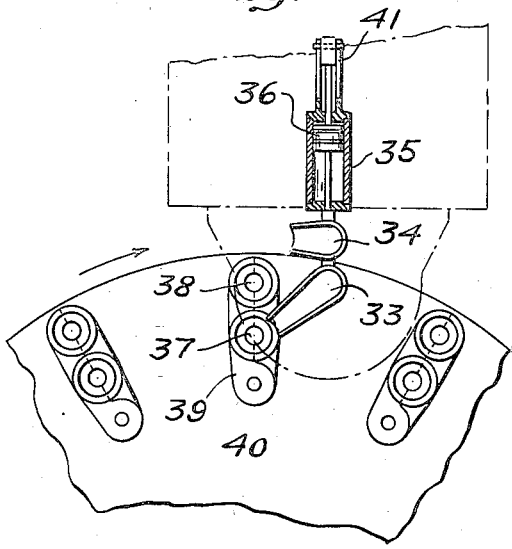
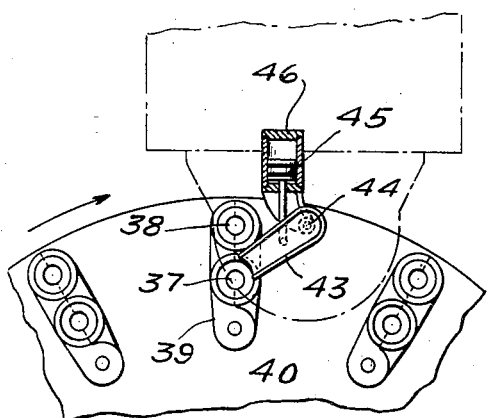
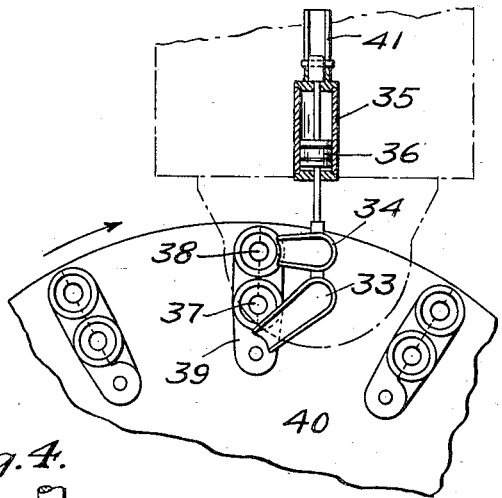
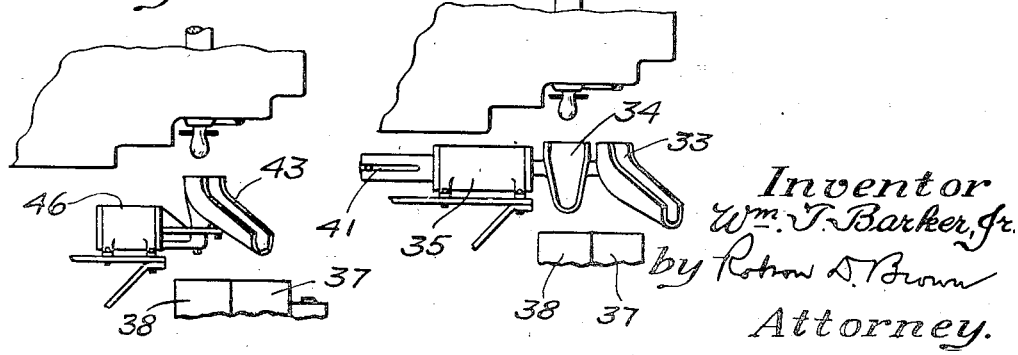
Inventor  
Wm. T. Barker, Jr.  
by Robert D. Brown  
Attorney.

Patented Oct. 11, 1927.

1,645,221

UNITED STATES PATENT OFFICE.

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR FEEDING MOLTEN GLASS.

Application filed November 20, 1926. Serial No. 149,586.

My invention relates to the art of feeding molten glass in mold charges. The primary object of my invention is to provide a feeder having an impelling means periodically acting upon the glass in such a manner as to successively discharge two or more charges, each suitable for a mold cavity of a mold of a glass forming machine, during each cyclic movement of the impelling means.

In the embodiment of my invention here shown, a feed controlling implement or plunger, mounted and driven to reciprocate periodically from and toward an outlet in the bottom of a glass container or forehearth, is actuated by suitable means such as a cam, so shaped as to divide each cycle of the plunger movement into two or more distinct stages separated by periods of dwell, or of slight reversal, each of these stages resulting in the discharge and formation of a charge of glass, which is severed by suitable shearing mechanism and delivered by my novel delivery means to the proper cavity of a plural cavitied mold of a continuously rotating shaping machine.

Referring to the appended drawings:

Figs. 2, 3 and 4 are diagrammatic views, partially in section, of an embodiment of my glass delivery mechanism delivering successive mold charges to molds provided with two mold cavities; and Figs. 5, 6 and 7 are diagrammatic views showing a modified form of delivery mechanism adapted to deliver successive mold charges to molds having two mold cavities.

Figure 1:
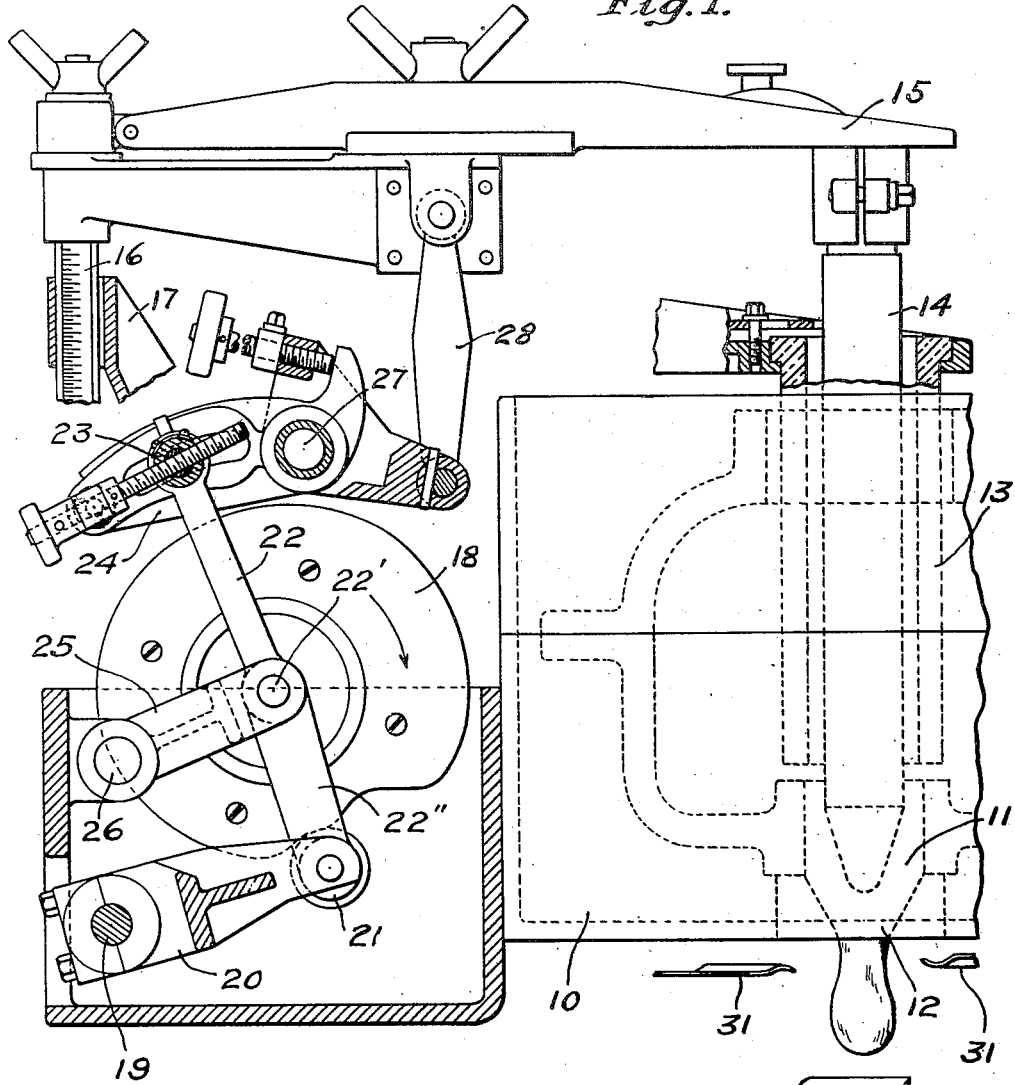
Figure 1 is a diagrammatic view of a cam operated glass feeder embodying my invention.
Figure 1:
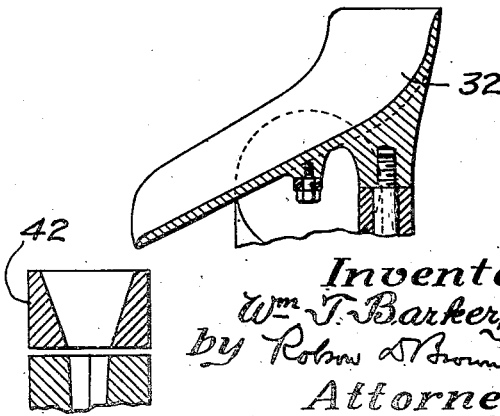

Referring to Fig. 1 of the drawings—the part 10 is a container for a supply of molten glass constantly supplied thereto from a melting tank, not shown, having a discharge well 11 in the bottom thereof, adapted to be submerged by the glass in the container and terminating in an outlet 12. An adjustable tube 13 extends through the top of the container and into the glass in axial alignment with the discharge outlet 12. A plunger 14 adapted to reciprocate within the tube and the well toward and from the outlet is mounted upon a suitable arm 15, having a guiding rod 16 outside of the container adapted to slide within a guide 17.

Movement is imparted to the plunger 14 by the rotating cam 18 through the cam roll 21 and the system of links and levers shown.

An adjustable lever arm 24 is pivoted as at 27 to the feeder frame, and is connected at one end to a link 28 which, in turn, is connected to the plunger arm 15. The opposite end of the arm 24 is provided with an adjustable pivot 23 carrying a link 22, the opposite end of which is pivoted as at 22' on one end of an arm 25. The arm 25 is pivoted at its other end to the feeder frame. A link 22'' is also pivoted at 22' on the moving end of the arm 25 and at its opposite end on the end of an adjustable arm 20. The arm 20 is pivoted to the feeder frame as at 19 and carries a cam roll 21 adapted to follow the contours of the cam 18.

It is seen that, through these provisions, when the cam 18 rotates, the arm 24 is oscillated and the plunger moved toward and away from the outlet.

The cam 18 is so shaped that the down stroke of the plunger 14 is divided into two or more stages, during each of which it expels a mass of glass of shape and size suitable for the mold cavity to be filled.

Reciprocating shears 31 are provided below the container for severing the glass discharged from the outlet 12 during each stage of the plunger movement.

A suitable delivering apparatus 32 is provided below the container to receive the charges as severed and deliver them to their mold cavities.

As shown in Figs. 2, 3 and 4, the delivery mechanism comprises a pair of chutes or deflectors 33 and 34, mounted upon the rod of piston 36 of a cylinder 35, and adapted to be reciprocated upon the operation of said piston by fluid pressure applied periodically to the opposing ends of the piston, and to alternately receive respectively the first and second charges formed during each complete reciprocation of the plunger, and to deliver them to the cavities 37 and 38 of the two-part molds 39, mounted upon a continuously rotating mold table 40.

It is noted that the chutes 33 and 34, are made of different lengths, so that the delivery of the charges to their respective molds may be made at the proper times. The chute 33 delivering the first of the pair of charges must deliver its charge to the mold cavity 37 at a time prior to the time of delivery by the chute 34 of its chage to the mold 38, and hence must deliver the charge at a point further removed from the line of discharge of the glass by the feeder.

The operation of the piston 36 may be co-ordinated and synchronized with that of the plunger mechanism by any suitable timing mechanism, such as that disclosed in my co-pending application, Serial No. 101,663, filed April 13, 1926.

As shown in Figs. 2, 3 and 4, the piston rod of the piston 30 is provided with a rearward extension operating in guides 41 for maintaining the vertical position of the rod and the chutes carried thereon.

The operation of the above described embodiment of my invention is as follows—molten glass from the container 10 passes, at a rate controlled by the tube 13, into the orifice 11, and then under the control of the reciprocating plunger 14 through the outlet 12. Starting from its upper position, the plunger slowly descends as the first charge begins to form, and then descends more rapidly, increasing the rate of expulsion of the glass and filling out the charge approximately as shown in Fig. 1 (which illustrates the plunger at the end of the first stage of its down stroke). The descent of the plunger is then stopped, or a slight upward movement is applied. At this time the shears operate to sever the glass, and the first charge is dropped into its chute. The plunger then again descends, impelling more glass through the orifice to form the second charge of its cycle, which charge is severed when the plunger is in its lowest position, or as it starts to ascend. The plunger then rises rapidly to its original position, delaying the issue of the glass to permit the next mold to approach the charging position.

The first charge is received in the chute 33 and delivered to a mold cavity 37, preferably through a funnel 42. At the proper time the piston 36 is moved forwardly, so that the second charge is received in the chute 34 and delivered to a mold cavity 38. The piston is then returned and the dual operation of the plunger is repeated as the next pair of mold cavities move toward and into receiving position.

Figs. 5, 6 and 7 show a modified form of a delivery mechanism, embodying my invention, wherein a single chute 43 is used to deliver charges to the mold cavities 37 and 38 of a two-part mold. Chute 43 is pivoted upon a stationary pivot 44, about which it is oscillated by the piston rod of a piston 45 of a cylinder 46. By the use of this modified form, as shown in Figs. 5, 6 and 7, the outer mold cavity of each mold is filled by the first charge formed during each cycle of the plunger, while in the use of the delivery mechanism of Figs. 2, 3 and 4, the outer cavity was filled with the second such charge.

My invention is useful—not merely in feeding molds each having a plurality of similar mold cavities, but also in feeding molds having differently shaped and sized mold cavities, and is readily adaptable, by the use of suitable cams and timing mechanism, to the simultaneous manufacture on one shaping machine of a plurality of kinds of glassware.

My invention is also similarly adaptable to the feeding of molds, of the same or different shape, carried on a plurality of shaping machines or mold-tables, and to the use of intermittently as well as continuously rotating shaping machines.

While I have shown and described mechanical means for operating the plunger to impart the desired movements thereto to produce a plurality of mold charges during each complete cycle of the plunger operation, it is obvious that fluid pressure means may be employed and operated with a similar result, and that while I have shown fluid pressure operating mechanism operating the delivery apparatus, a mechanically operating mechanism may be substituted therefor.

Various changes may be made in the construction and arrangement of my invention without departing from the cope of the invention set forth in the appended claims which are not to be limited by the specific construction set forth herein, but are to be construed as broadly as the terms will permit.

I claim as my invention:

1. The method of feeding molten glass in mold charges, which comprises discharging a mass of glass through an outlet in a container under the influence of the expulsive movement of an impelling means, severing a mold charge from such mass, expelling a further mass of glass under the continued expulsive movement of the impelling means, and severing a mold charge from such further mass.

2. The method of feeding molten glass to a mold having a plurality of cavities, which comprises discharging a plurality of successive masses of glass from a container by the downward movement of an impeller in adhesive contact with the glass, severing a mold charge from each mass, and delivering said charge to its respective mold cavity.

3. The method of feeding molten glass to a mold having a plurality of mold cavities of differing size and shape, which comprises expelling glass through an outlet and past a severing plane by two-stage downward movement of an impeller in adhesive contact with the glass, severing a mold charge from the glass expelled during each stage, and successively delivering such charges to their respective mold cavities.

4. The method of feeding molten glass to a glass shaping machine provided with molds, each having a plurality of mold cavities which comprises, discharging glass through a single outlet in the bottom of a container, controlling the discharge by a single reciprocation of an impeller in adhesive contact with the glass, severing a plurality of mold charges from the glass so discharged, and delivering each of said mold charges to its respective mold cavity.

5. The method of feeding molten glass in mold charges to mold tables having a plurality of molds upon the radial line through each mold station, which comprises periodically discharging glass through a single submerged outlet in a glass container, severing a plurality of charges from each periodic discharge, and delivering each charge to its proper mold.

6. The method of feeding molten glass to molds having a plurality of mold cavities, which comprises impelling glass through an outlet by a plural stage downward movement of an impeller, severing a plurality of charges from the glass, and delivering each such charge along a separate path to its proper mold cavity.

7. Glass feeding apparatus, comprising a container for the glass having an outlet, a plunger adapted to periodically move in the glass toward and away from the outlet, means for moving the plunger away from the outlet and for moving the plunger toward the outlet in a plurality of stages to expel glass through the outlet and to successively suspend from the outlet masses of glass each suitable for a mold charge, and means for severing a mold charge from each such mass.

8. Apparatus for feeding molten glass to molds provided with a plurality of mold cavities, comprising a glass container having an outlet, an impeller adapted to reciprocate in the glass toward and away from the outlet and to discharge on each reciprocation successive masses of glass each of size and shape to form, when severed, a mold charge, severing means for severing a mold charge from each such mass, and delivering means adapted to receive each charge when severed, and to deliver it to its proper mold cavity.

9. Glass feeding apparatus including a container for the glass having a single outlet, an impeller acting upon the glass above the outlet, means for reciprocating the impeller, and means for timing the impelling stroke of the impeller to produce a plurality of successive masses of glass, each suitable to form, when severed, a mold charge, and means for severing the masses so formed.

10. Glass feeding apparatus comprising a container for the glass having a submerged outlet, a plunger submerged in the glass in axial alignment with, and reciprocable toward and from the outlet, to impel and retard the discharge of glass through the outlet, means for reciprocating the plunger including a cam adapted to divide the plunger stroke toward the outlet into a plurality of stages, and severing means for severing a mold charge from the glass discharge during each stage of the said plunger stroke.

11. Apparatus for delivering mold charges of molten glass to molds, each having a plurality of mold cavities which comprises, a chute adapted to receive the charges and to direct them into their mold cavities, and means for moving the chute successively into registering relation with a plurality of mold cavities.

12. Apparatus for delivering mold charges to a plurality of mold cavities located on the same radial line of a continuously moving mold table, comprising a conveyor mounted for oscillation, and means for oscillating said conveyor to bring its delivery end successively into register with each of said mold cavities.

Signed at Hartford, Connecticut, this 16th day of November, 1926.

WILLIAM T. BARKER, Jr.